Jan. 1, 1935.   H. H. MANNING ET AL   1,986,588
HUB PULLER
Filed May 19, 1932
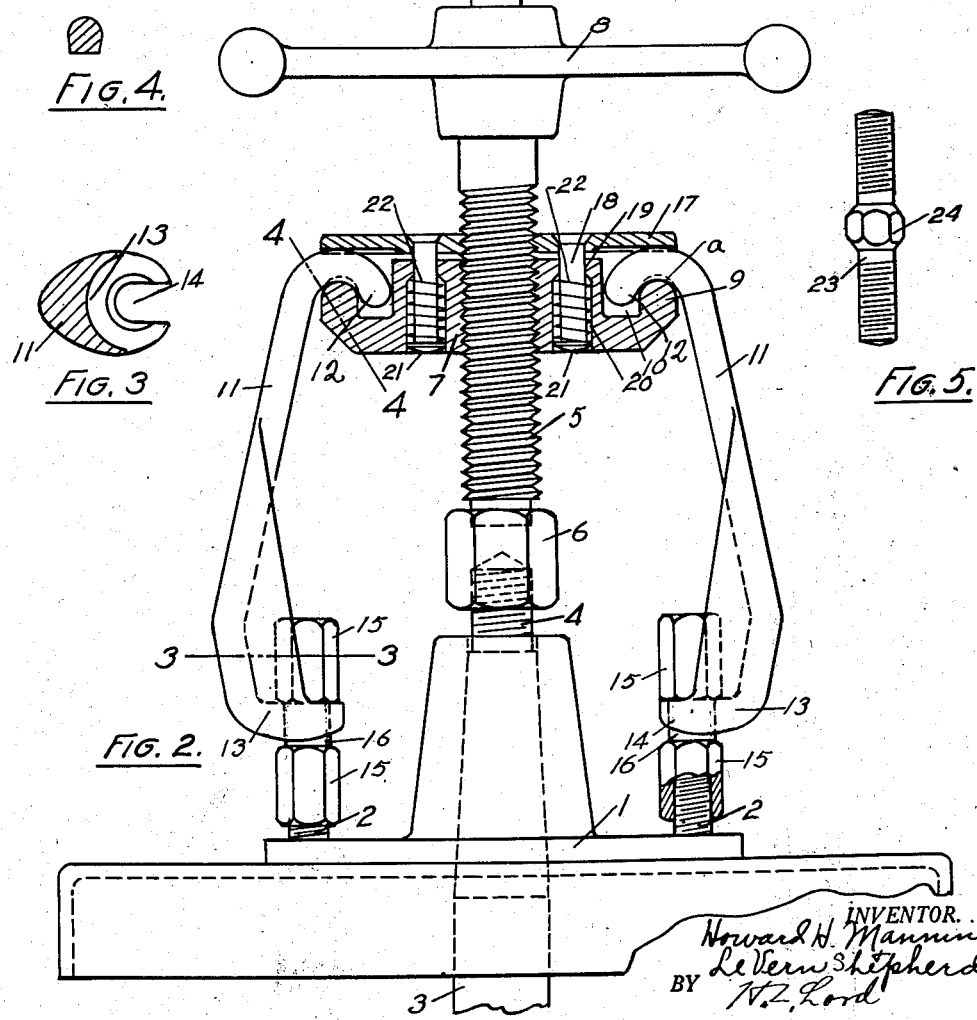

Patented Jan. 1, 1935

1,986,588

UNITED STATES PATENT OFFICE 1,986,588

HUB PULLER

Howard H. Manning, Meadville, and Le Vern Shepherd, Girard, Pa., assignors to Champion De Arment Tool Company, Meadville, Pa., a corporation of Pennsylvania Application May 19, 1932, Serial No. 612,192

4 Claims. (Cl. 29—85)

Detachable wheels for automobiles require a puller for releasing the wheels from the axle. The hubs of these wheels are usually secured in place by screws, either tap screws, or studs and these vary in number. The present invention is designed to provide a puller which may be readily adapted to the hubs of different types. Features and details of the invention will appear from the specification and claims.

A preferred embodiment of the invention is illustrated in the accompanying drawing as follows:—

Fig. 1 shows a side elevation of the device.
Fig. 2 a central section of the device.
Fig. 3 a section on the line 3—3 in Fig. 2.
Fig. 4 a section on the line 4—4 in Fig. 2.
Fig. 5 an adapter for hubs using cap screws.

1 marks the wheel hub, 2 the studs by which the hub is secured to the wheel, 3 the axle, and 4 a screw-threaded end of the axle. These are of common construction.

The puller comprises a screw 5 which is seated in a thrust bearing in a nut 6 screwed on to the end of the axle. A fitting 7 has a screw-threaded opening in which the screw operates and the end of the screw is provided with an operating handle 8.

The fitting has an annular peripheral flange 9 providing an annular groove 10. A series of pull links 11 have the hooked outer ends 12 which are adapted to hook over the flange 9, the hooked ends extending into the groove 10. The lower end of the link has a hook 13 provided with a forked end 14. A connector is formed with two nuts, or screw-threaded heads 15 and these are connected by a neck 16. One or the other nut is screwed onto the stud 2, one of these nuts being preferably threaded with a right-hand pitch and the other with a left-hand pitch so that one or the other will be available for studs of either pitch. The forked end 14 straddles the neck 16 and engages the outer nut 15.

There are a plurality of these links and it will readily be seen that with the links so engaged if the screw 5 is operated the hub is pulled against the thrust pressure on the end of the axle.

In order to adapt the device for hubs having varying numbers of studs, the flange 9 is provided with a plurality of depressed seats so arranged that the links may be so opposed as to assure a uniform pull on the hub. These seats are designated $a$, $b$, $c$, $d$, and $e$ on the drawing. Thus with one link in the seat $a$ and the other links in the seats $b$, the links are adapted for a hub having six studs. When the links are seated in the seats $a$ and the other two links in the seats $c$, $c$ the puller will be adapted for a hub with five studs. Again with the link in the seat $a$ and the other links in the seats $d$ the device is adapted for a seven stud wheel and with the links in the seats $e$, $e$ and the seat $d$ at the lower edge, as shown in Fig. 1, the device is adapted for an eight stud wheel.

In order to hold the links in their seats I provide a holding plate 17. Pins 18 are secured in this plate and extend through openings 19 in the fitting 7 and into sockets 20. The pins 18 have heads 21 in the sockets and springs 22 are arranged between the head and the wall at the bottom of the socket. Thus the plate 17 presses the links yieldingly into the seats. On the other hand, when it is desired to adjust one of the links the plate will readily yield allowing the link to be withdrawn from one seat and moved along to the proper seat to give the spacing for the desired number of studs.

Occasionally there is a wheel in which the hubs are provided with cap screws. In this event, a double-ended stud 23 may be used (see Fig. 5) having a centrally arranged head 24. With this screw put in place the forked ends of the links will engage a head 24 and so form the anchorage for the links. Again the screws at the opposite ends of the stud 23 may have opposite pitches.

The plate 17 which really forms the yielding part of the fitting has grooves on its under-face corresponding to the depressions in the part 7. Thus the links 11 may be spaced by depressions in either the part 7, or the plate 17, or by both, as shown.

What we claim as new is:—

1. In a hub puller, the combination of a screw; a fitting through which the screw operates; a plurality of links mounted on the fitting; means permitting the circumferential adjustment of the links on the fitting comprising a series of differently spaced seats; and a thrust bearing for the screw adapted to engage an axle.

2. In a hub puller, the combination of a screw; a fitting through which the screw operates; a plurality of links mounted on the fitting; means permitting the circumferential adjustment of the links on the fitting comprising a series of differently spaced seats and means holding the links in the seats; and a thrust bearing for the screw adapted to engage an axle.

3. In a hub puller, the combination of a screw; a fitting through which the screw operates; a plurality of links mounted on the fitting; means permitting the circumferential adjustment of the links on the fitting comprising a series of differently spaced seats and means for yieldingly holding the links in the seats; and a thrust bearing for the screw adapted to engage an axle.

4. In a hub puller, the combination of a screw; a fitting through which the screw operates, said fitting having a series of differently spaced seats; a plurality of links having hooked ends mounted in the seats; a plate engaging said hooked ends; yielding means attaching the plate to the fitting; means securing the links to the hub attaching connections; and a thrust bearing for the screw adapted to engage an axle.

HOWARD H. MANNING.
LE VERN SHEPHERD.